United States Patent Office 3,490,735
Patented Jan. 20, 1970

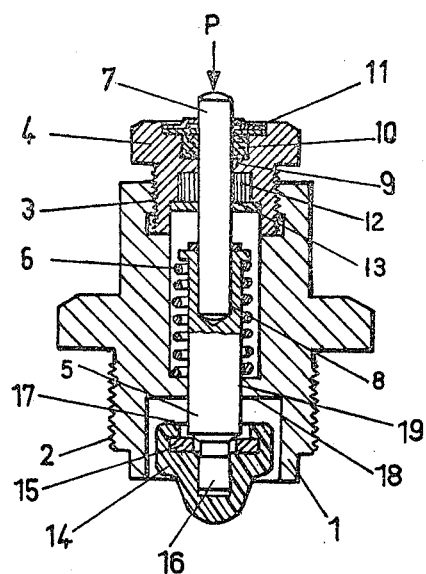

3,490,735
PACKED STEM VALVE
Helmar Trost Nielsen, Nordborg, and Knud Aage Hansen, Sonderborg, Denmark, assignors to Danfoss A/S Nordborg, Denmark, a corporation of Denmark
Continuation of application Ser. No. 366,774, May 12, 1964. This application Oct. 14, 1968, Ser. No. 768,219
Claims priority, application Germany, July 6, 1963, D 41,922
Int. Cl. F16k 31/44, 15/00, 25/00
U.S. Cl. 251—214          5 Claims This is a continuation of our application Ser. No. 366,774, filed May 12, 1964.

This invention relates generally to packed stem valves and more particularly to a method and means of protecting the stem valve packing in such valves.

In known packed stem valves the packing box is generally removable for repacking of the valve. These valves can either be isolated during repacking thereof and in preferred constructions the valve will continue in operation usually in an open condition while the packing box is removed and repacked. It has been found from experience that the fluid tightness of the packing box deteriorates faster or with greater rapidity than can be explained by the natural wear of the packing due to actuation of the valve stem. Experience teaches that a considerable decrease in the effectiveness of the packing in packed stem valves results from the fact that impurities, for example, calcium deposits, are deposited, by leakage along the valve stem, on the stem valve packing thereby reducing the effectiveness of the seal or fluid-tightness of the packing even though the packing was not subjected to great wear.

A principal object of the present invention is to provide a new and improved packed stem valve construction in which the packing has a greater life and the valve thereby requires fewer repackings.

Another object of the invention is to provide a method and means of protecting the stem valve packing in packed stem valves from deposition of impurities thereon by leakage of the fluid controlled by the valve.

A feature of the invention is the provision of a liquid permeable filter disposed circumferentially of the valve stem of the packed stem valves which filter out salts in the liquid being controlled by the valve so that any leakage along the valve stem reaching the stem valve packing itself is substantially the pure liquid.

Another feature of the invention is the provision of a lubricating gland immediately adjacent the packing and circumferentially of the valve stem tending to maintain the packing in a lubricating condition.

The filter means according to the invention comprises a felt ring or disc which may be impregnated with a lubricant tending to further lubricate the stem and increasing the filtering properties of the filter means.

In the packed stem valve construction according to the invention, the valve is provided with a valve body portion and a valve disc therein operably connected to a valve stem which is operable to a position for opening and closing the valve. The body portion comprises a packing box disposed circumferentially of the stem valve packing and is readily removable from the valve for repacking. The valve stem is constructed in a two-part construction, permitting easy disassembly of the valve stem and removal of the packing box. A filter disc is provided in the packing box which itself is divided to provide two coaxial recesses, one of which houses the filter which is disposed downstream of the packing relative to any leakage axially of the valve stem thereby filtering any of the fluid, for example water, and precluding deposition of the salt or other contaminants on the packing which is housed in a separate recess in the packing box circumferentially of the valve stem.

Other features and advantages of the valve in accordance with the present invention will be better understood as described in the following specification and appended claims, in conjunction with a drawing comprising a sectional view of a body portion of a packed stem valve embodying the invention.

The packed stem valve illustrated in the drawing embodying the invention is a valve in which the opening and the closing of the valve is controlled by a thermostatic operator, and the valve is constructed to preclude any leakage during repacking of the packing box, those skilled in the art will understand that the invention is equally applicable to manually operated valves in which the valve stem is rotatably driven and is equally applicable to packed stem valves in which the section of the line in which the valve is located can be isolated rather than maintained in operation in the manner of the type valve disclosed.

According to the drawing, a packed stem valve for controlling the flow of hot water is illustrated in section fragmentarily. The drawing illustrates a valve body portion 1 provided with threads 2 with which the valve body portion is connected to a valve body, not shown, having therein an inlet and outlet and a valve seat on which a valve disc, later hereinafter described, is operated to a seated and an unseated position for opening and closing the valve.

The valve body portion is provided with an internal thread 3 for removably mounting a packing box 4 on the valve body portion 1 and connected thereto as illustrated. The valve body portion 1 and the valve stem packing box are provided with a central opening and respective bore of different diameters to receive a two-part valve stem extending axially therethrough. The valve stem comprises a lower part or portion 5 extending axially through the valve body portion 1 and an internal bore therein and into a blind bore of larger diameter open at one end. A spring 6 is disposed circumferentially of the valve stem part 5 and is seated on a collar formed on a free end of the stem part 5 and on a shoulder formed in the internal bore of the valve body 1 on a major diameter portion thereof for biasing the valve portion 5 in an upward direction shown on the drawing sheet. The direction in which the spring 6 biases the stem part 5 is a direction for opening the valve as later described.

The valve stem comprises a second valve stem portion or spindle part 7 extending axially through the bore and central opening in the packing box 4 and is received in a blind bore 8 extending axially in the valve stem 5 to which the first mentioned stem part is secured. It will be understood that the valve stem part or spindle 7 is operated axially in a direction indicated by the arrow designated P in opposition to the spring 6 for closing the valve. The valve stem 7 is operably connected to an operator or regulator, not shown, for example a thermostatically controlled operator for operation therefrom as required.

The packing box 4 is provided with a central dividing wall 9 having a central aperture through which the stem 7 extends. The dividing wall defines two oppositely disposed coaxial cavities or recesses, an upper one in which is received a stem valve packing ring 10 made of suitable construction and material in dependence upon the liquid being controlled by the valve. The packing may be, for example, an O-ring. The packing 10 is held in position by a washer or gland 11, the underside of which is provided with a suitable lubricant for the packing 10. In the second or lower cavity or recess formed in the packing box by the dividing wall a filter 12 is disposed circumferentially of the valve stem 7. The filter is liquid permeable and is constructed, for example, as a felt washer or disc that will filter out salts and other contaminant materials in the liquid controlled by the valve and precludes their deposition on the packing 10 by leakage axially of the valve stem. It being understood, that the filter 12 is not intended to assist in the fluid-tightness of the valve and its principal function is that of filtering. For example, the valve illustrated in the drawing is intended for controlling water and the filter 12 is constructed to filter salts, for example calcium salts in the water, thereby to preclude the deposition of calcium deposits on the packing 10 which after a period of time reduce the effectiveness of the seal of the packing and require repacking of the valve even though the packing is not worn. The felt ring or washer 12 is held in position by a clamping ring 13 disposed circumferentially of the valve stem and having a central opening so that the valve stem can operate axially as before described.

The valve disc in the valve illustrated comprises a valve disk 14 made of a resilient material and having a central cavity having an opening therein and the sidewalls defining the cavity converging in the direction of the opening for snugly receiving a truncated or generally conically shaped axial extension 16 of the valve stem part 5. The valve stem extension 16 has wall surfaces that diverge axially in a direction away from the axis of the valve stem and its own axis and diverge away from the lower end of the valve stem, as illustrated. An intermediate cylindrical section between the part 16 and the valve stem 5 joins the extension 16 integrally with the valve stem portion 5. The valve disk is provided with an annular plate 15 disposed circumferentially of the cylindrical part of the valve stem part 16 and an edge thereof defining a central aperture in the plate cooperates with a beveled or tapered portion of the valve stem 5 to permit axial alignment of the valve disk with respect to its seat, not shown, in the event that there is any disalignment or canting of the valve stem relative to the valve seat.

The valve disk is provided with an annular portion 17 also made of a resilient material integral with the other portions of the valve disk and which is seated against a lower, annular surface 18 formed on the valve body portion 1 and circumferentially of the valve stem 5 for effectively making an effective fluid-tight seal therebetween when the valve disk portion 17 seats thereon upon disconnection of the operator, not shown, for removal of the packing box 4. Removal of the packing box requires disconnecting the valve stem from the operator or regulator, not shown, thereby allowing the spring 6 to bias the valve upwardly seating the annular portion 17 against the surface 18 and establishing a substantially fluid-tight seal and precluding any leakage outwardly along the valve stem during repacking of the valve. It being understood, that in this kind of condition, the valve will be in an open condition and the section of line, not shown, in which the valve is installed can remain operative.

Those skilled in the art will understand that the valve stem according to the invention can be constructed for manual and rotatable operation and that the method and means of filtering the liquid leakage along the valve according to the invention can be provided in other packed stem valves of different constructions than that illustrated.

We claim:

1. For use in a repackable valve for controlling a liquid in combination, a valve member operable to a first position opening said valve and to a second position closing said valve, a two-part separable valve stem operable axially for actuating said valve member to said two positions, one part of said stem comprising a valve spindle operable axially in use under control of a thermostatic actuator for actuating said valve member and disconnectable and connectable with the other part of said valve stem, a stuffing box having two coaxial recesses and in use disposed circumferentially of said valve spindle with said valve spindle extending axially therethrough with said recesses disposed circumferentially of said valve spindle and axially spaced thereon, an annular packing in one of said recesses of said stuffing box disposed circumferentially of said spindle to effect a seal therewith to preclude liquid flow axially of said valve spindle in a direction externally of said valve, an annular filter disposed in the other of said recesses removable from said other recesses when said stuffing box is removed from the valve and disposed circumferentially of said spindle axially inwardly of packing to filter any liquid leakage axially of said valve spindle to reduce deposit of solid and solidifiable materials from said liquid onto said packing, and removable gland removably holding said packing in said stuffing box and said filter comprising an impregnant to increase the filtering effectiveness of said filter and for lubricating said filter.

2. The combination according to claim 1, in which said stuffing box comprises a partition between said recesses axially spacing the recesses, said partition having an opening through which said spindle extends axially.

3. The combination according to claim 1, in which said packing comprises an O-ring, and in which said gland has a lubricant in contact with said packing.

4. For use in a repackable valve for controlling a liquid, said valve having a valve member operable to a first position opening said valve and to a second position closing said valve, a two-part separable valve stem operable axially for actuating said valve member to said two positions, one part of said stem comprising a valve spindle operable axially in use under control of a thermostatic actuator for actuating said valve member and disconnectable and connectable with the other part of said valve stem, the improvement which comprises, a stuffing box having two coaxial recesses spaced coaxially and in use disposed circumferentially of said valve spindle with said valve stem extending axially therethrough with said recesses disposed circumferentially of said valve spindle and axially spaced thereon, an annular packing in one of said recesses of said stuffing box disposed circumferentially of said spindle to effect a seal therewith to preclude liquid flow axially of said valve spindle in a direction externally of said valve, an annular filter dispose in the other of said recesses removable from said other recess when said stuffing box is removed from the valve and disposed circumferentially of said spindle axially inwardly of packing to filter any liquid leakage axially of said valve spindle, to reduce deposit of solid and solidifiable materials from said liquid onto said packing, a removable gland removably holding said packing in said stuffiing box, and said filter comprising an impregnant to increase the filtering effectiveness of said filter and for lubricating said filter.

5. The stuffing box according to claim 4, in which said gland has a lubricant in contact with said packing.

References Cited

UNITED STATES PATENTS 3,030,068   4/1962   Priese _____ 251—214

WILLIAM F. O'DEA, Primary Examiner

D. R. MATTHEWS, Assistant Examiner

U.S. Cl. X.R.

251—323